US009033419B2

(12) United States Patent
Thiel

(10) Patent No.: US 9,033,419 B2
(45) Date of Patent: May 19, 2015

(54) FITTING FOR A VEHICLE SEAT

(75) Inventor: Peter Thiel, Remscheid (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 329 days.

(21) Appl. No.: 13/583,811

(22) PCT Filed: Feb. 24, 2011

(86) PCT No.: PCT/EP2011/000912
§ 371 (c)(1),
(2), (4) Date: Sep. 10, 2012

(87) PCT Pub. No.: WO2011/110288
PCT Pub. Date: Sep. 15, 2011

(65) Prior Publication Data
US 2013/0154330 A1 Jun. 20, 2013

(30) Foreign Application Priority Data
Mar. 11, 2010 (DE) ......................... 10 2010 011 323

(51) Int. Cl.
*B60N 2/20* (2006.01)
*B60N 2/02* (2006.01)
*B60N 2/12* (2006.01)
*B60N 2/225* (2006.01)
*B60N 2/235* (2006.01)

(52) U.S. Cl.
CPC .. *B60N 2/20* (2013.01); *B60N 2/12* (2013.01); *B60N 2/2252* (2013.01); *B60N 2/2358* (2013.01); *B60N 2002/126* (2013.01)

(58) Field of Classification Search
CPC ................................. B60N 2/123; B60N 2/20
USPC ................................ 297/378.14, 378.12, 341
See application file for complete search history.

(56) References Cited

U.S. PATENT DOCUMENTS 6,540,232 B2 * 4/2003 Hansel et al. ................. 277/367
6,805,410 B2 * 10/2004 Christoffel et al. ...... 297/378.12
(Continued)

FOREIGN PATENT DOCUMENTS

DE 44 36 101 A1 6/1995
DE 44 39 644 A1 6/1995
(Continued)

OTHER PUBLICATIONS

International Preliminary Report on Patentability (IPRP—Corrected Version) PCT/EP2011/000912 dated May 16, 2013.

*Primary Examiner* — David R Dunn
*Assistant Examiner* — Tania Abraham
(74) *Attorney, Agent, or Firm* — Foley & Lardner LLP

(57) ABSTRACT

In a fitting for a vehicle seat, a catch assembly has a pivot axis, and the catch assembly has a catch and a lever which can be pivoted relative to one another about an axis spaced from the pivot axis. The catch has a hook-like contour and in the pivoted-out position of the backrest engages with a catch locking element for locking in a punctiform or linear contact region. The catch cooperates with a spring. The lever is mounted pivotably about the pivot axis and the lever rotatably mounts the catch. In the unloaded pivoted-out position, the perpendicular in the contact region runs on one side of the pivot axis or through the pivot axis. When a return pivoting force is imposed on the backrest in the pivoted-out position, the perpendicular in the contact region runs on the opposing side of or outside of the pivot axis.

9 Claims, 14 Drawing Sheets

(56) References Cited

U.S. PATENT DOCUMENTS

Figure 1:
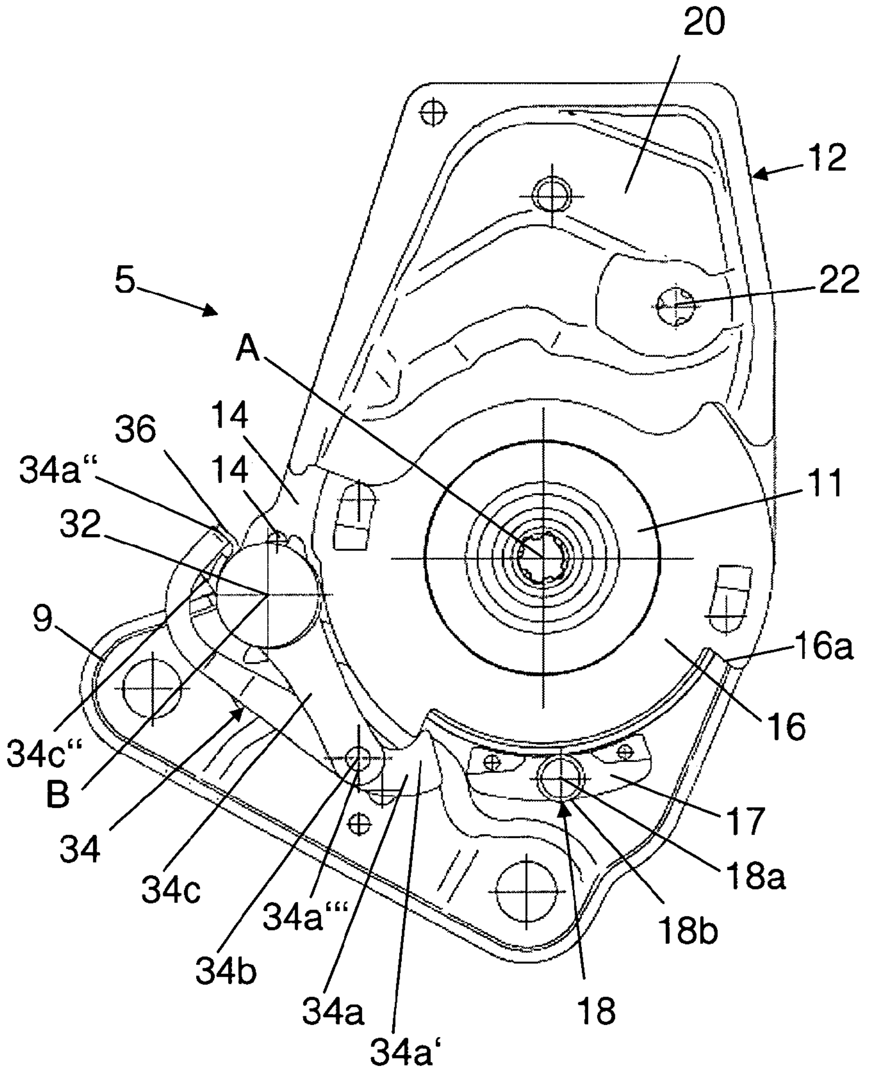

| | | | | |
|---|---|---|---|---|
| 7,086,698 | B2 * | 8/2006 | Shiraki | 297/367 R |
| 7,364,237 | B2 * | 4/2008 | Grable et al. | 297/378.1 |
| 7,434,883 | B2 * | 10/2008 | Deptolla | 297/341 |
| 7,503,099 | B2 * | 3/2009 | Pejathaya | 16/324 |
| 7,571,962 | B2 * | 8/2009 | Thiel et al. | 297/367 R |
| 7,673,943 | B2 * | 3/2010 | Ohta et al. | 297/362.11 |
| 7,963,608 | B2 * | 6/2011 | Wieclawski | 297/378.12 |
| 7,971,938 | B2 * | 7/2011 | Wieclawski | 297/378.12 |

FOREIGN PATENT DOCUMENTS

| | | | |
|---|---|---|---|
| DE | 101 05 282 | B4 | 8/2002 |
| DE | 102 06 304 | B4 | 8/2003 |
| DE | 10 2005 024 939 | A1 | 12/2006 |
| DE | 10 2006 044 489 | A1 | 8/2007 |
| DE | 20 2009 016 989 | U1 | 4/2010 |
| DE | 20 2010 012 612 | U1 | 5/2011 |
| WO | WO-00/44582 | A1 | 8/2000 |
| WO | WO-2009/143999 | A1 | 12/2009 |

* cited by examiner

Fig. 8
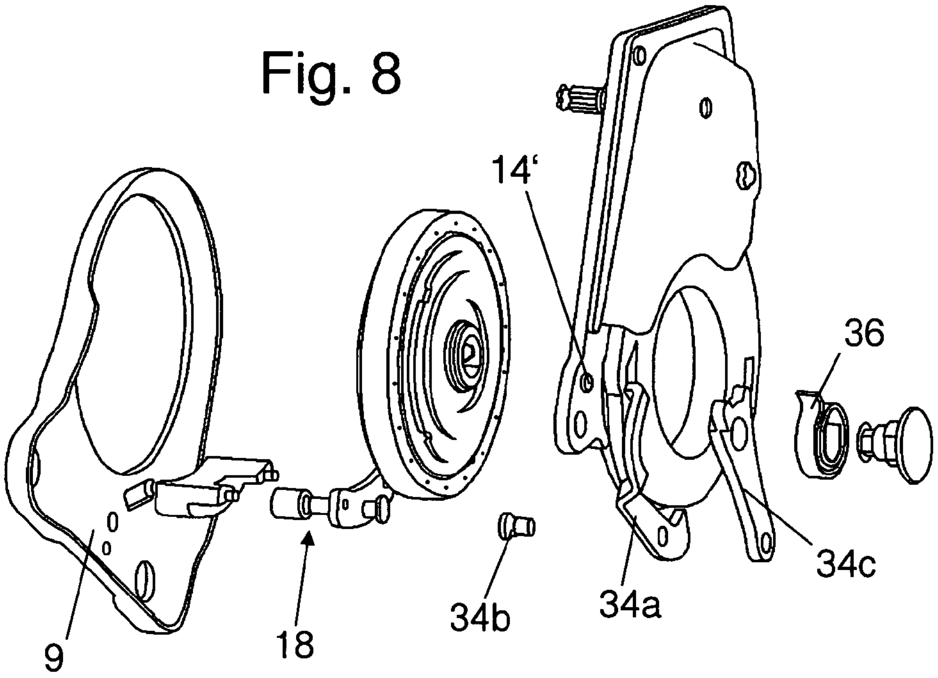
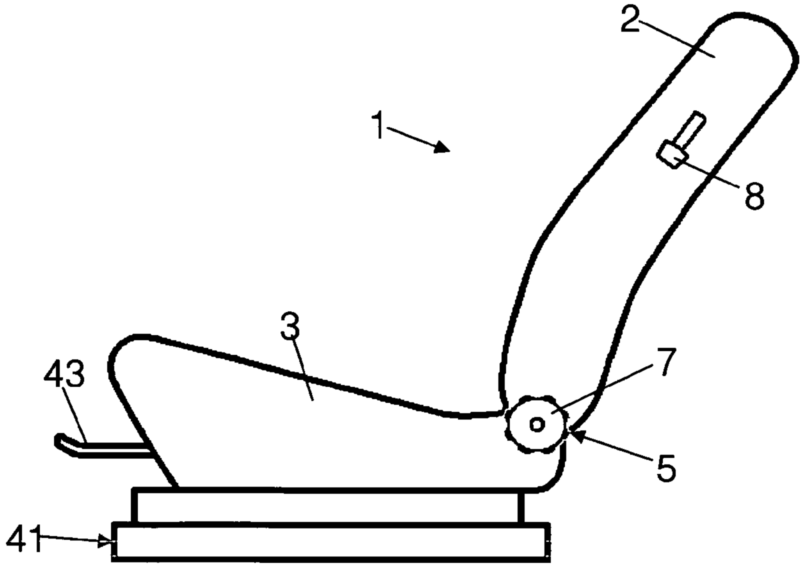
Fig. 9

FITTING FOR A VEHICLE SEAT

CROSS REFERENCE TO RELATED APPLICATIONS

The present application is a National Stage of International Application No. PCT/EP2011/000912 filed on Feb. 24, 2011, which claims the benefit of German Patent Application No. 10 2010 011 323.9 filed on Mar. 11, 2010, the entire disclosures of which are incorporated herein by reference.

The invention relates to a fitting for a vehicle seat, in particular for a motor vehicle seat, with the features of the preamble of claim 1.

DE 102 06 304 B4 discloses a fitting of this type for a two-door motor vehicle, which fitting is used to permit access to the rear by means of the backrest freely pivoting in the forward direction (for example in combination with the vehicle seat being pushed forward), and to provide different inclination adjustments of the backrest for use by an occupant. In order to prevent undesired pivoting-back of the backrest, for example if the upholstery in the transition region between the backrest and the seat part is too thick, the backrest is fixed by means of a catch in the freely pivoted position. The parts provided in this case are a lower part which can be fastened to the seat part structure, an upper part which is rotatable relative to the lower part and is intended for the inclination adjustment of the backrest of the vehicle seat between a plurality of use positions and a free-pivoting part which can be fastened to the backrest structure, can be locked to the upper part and can be pivoted relative to the upper part for a central free-pivoting of the backrest and, in the freely pivoted position, can be fixed to a securing element which is connected to the upper part, wherein a securing catch which is pivotable about a bearing pin is provided on the free-pivoting part, said securing catch interacting with the securing element in order to fix the free-pivoting part in the freely pivoted position, wherein the securing catch consists of a component having a locking region and a component mounted on the bearing pin, and wherein an elastic element is provided, said element changing the arrangement of the securing catch relative to the securing element in a force-controlled manner. In this case, the securing element is mounted rotatably on the upper part and is secured against rotation relative to the lower part. Furthermore, the elastic element is effective between the securing catch component having the locking region and the securing catch component mounted on the bearing pin.

DE 10 2005 024 939 A1 discloses a catch arrangement with a single-part catch which has a pivot axis fixed on the fitting lower part, wherein a pin, on which a rotatably mounted roller sits, is provided as the mating element.

The invention is based on the object of improving a fitting of the type mentioned at the beginning. This object is achieved according to the invention by a fitting with the features of claim 1. Advantageous refinements are the subject matter of the dependent claims.

By means of the provision of a catch arrangement instead of a simple catch, use can advantageously be made of force and torque effects caused by a change in the geometry.

In this connection, possible stiction forces are in particular preferably minimized by the provision of rolling instead of sliding sequences of movement between the catch and mating element.

The catch can be opened by means of a torque acting on the backrest, as is present during the pivoting-back of the backrest or pushing-back of the vehicle seat and reaching the previously set seat longitudinal position. This simplifies the handing in comparison to a renewed actuation of the free-pivoting operating element and simplifies the construction in comparison to activation by means of the longitudinal adjustor. Since the freely pivoted position does not occur when a vehicle is in motion, crash protection of the frictionally secured fixing does not need to be ensured. Fixing to the fitting lower part has the advantage that the freely pivoted position is virtually completely independent from the adjusted inclination of the backrest (apart from the engagement angle of the catch).

During the free-pivoting of the backrest, a catch of the catch arrangement can easily pivot upward with the further pivoting movement of the backrest upon reaching the mating element and can slide along said mating element—for example on the lower side thereof—until said catch, after passing the mating element, engages behind the mating element. The catch and the mating element preferably interact within the self-locking region. After the load in the opening direction increases, the self-locking merges into the non-self-locking region. In this case, the mating element is preferably designed with a cylindrical outer surface, at least in the contact region with the catch. In particular preferably, the friction in said contact region is minimized. This takes place particularly preferably in that the mating element has a locking pin with a ring mounted on a sliding or rolling bearing, and therefore a rolling movement and not a sliding movement occurs in the contact region, thus enabling the friction, in particular at the beginning of the movement, to be minimized. The mating element can at the same time have the function of a stop which restricts the comfort adjustment and free-pivoting path ranges.

The adjustment fitting preferably has two fitting parts which are connected to each other in transmission, for example by means of a self-locking eccentric epicyclic gear, and which are rotatable relative to each other.

As an alternative, the two fitting parts of an adjustment fitting designed as a latching fitting can be locked to each other by means of a bolt.

The invention is preferably usable in longitudinally adjustable vehicle seats of two-door motor vehicles with central free-pivoting of the backrest, but may also be used for other vehicle seats. When the fitting according to the invention is used for activating what is referred to as the “easy-entry function”, in which, apart from a free-pivoting of the backrest, movement of the vehicle seat also takes place, the backrest can be pivoted back precisely when the previously set seat longitudinal position is reached.

The invention may be used identically also for memorized fitting systems consisting of two latching fittings in the free-pivoting unit, as disclosed, for example, in WO 2009/143999 A1.

Figure 2:
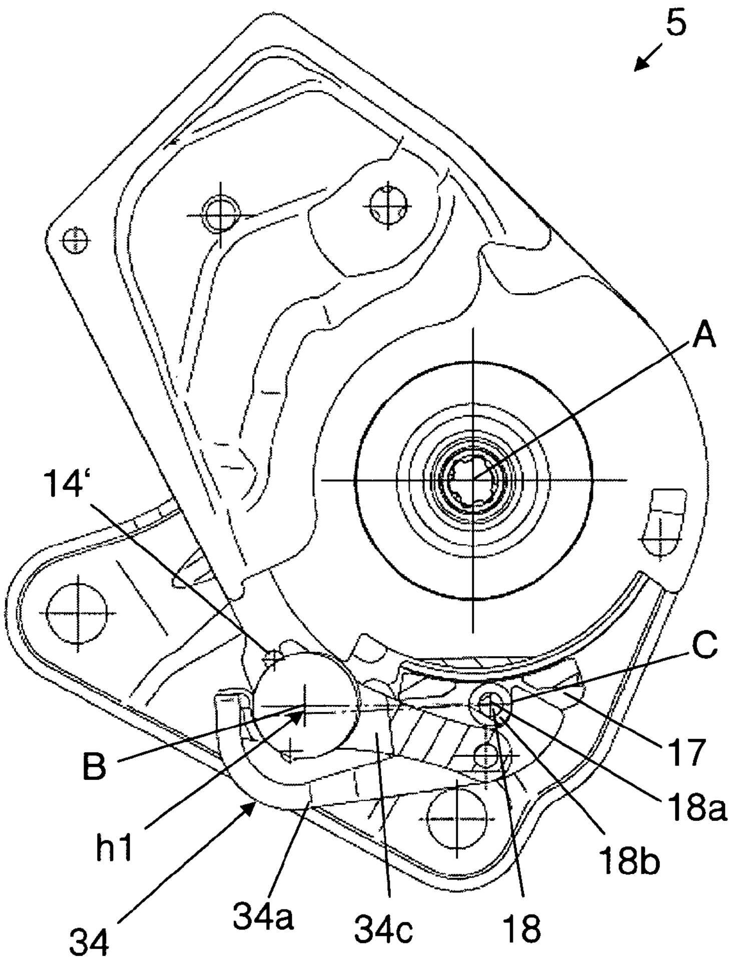
Figure 3:
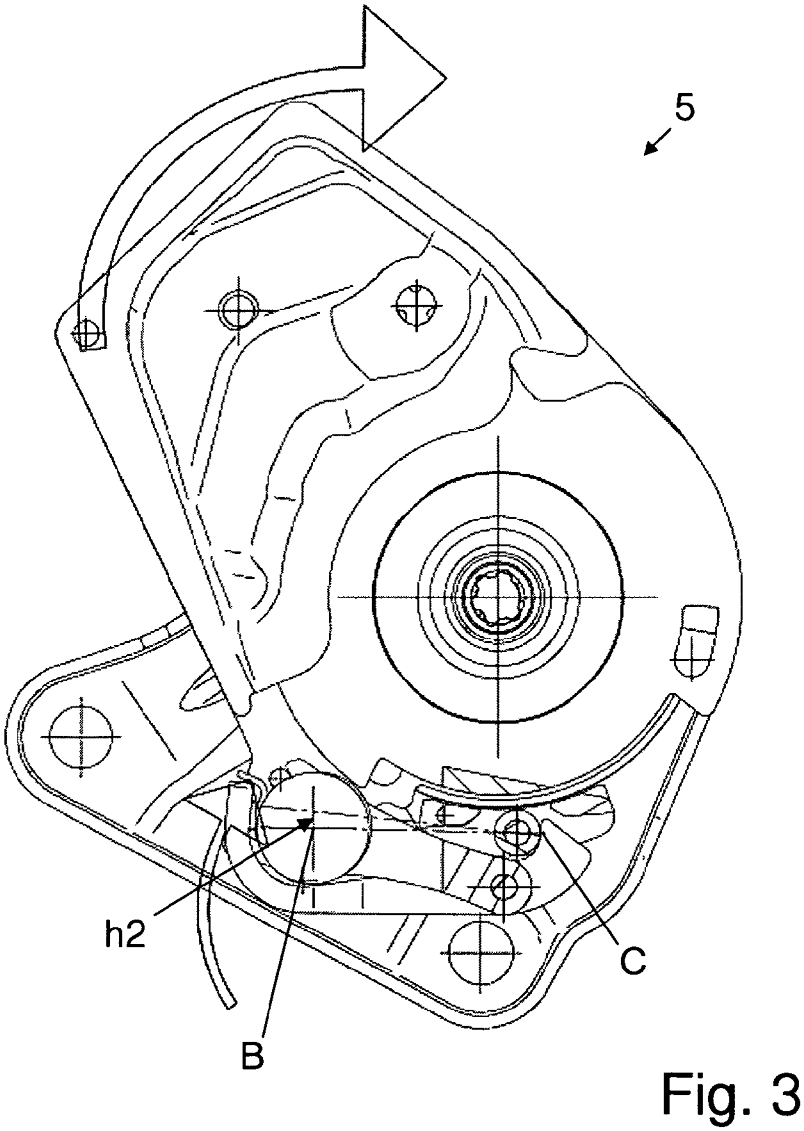
Figure 4:
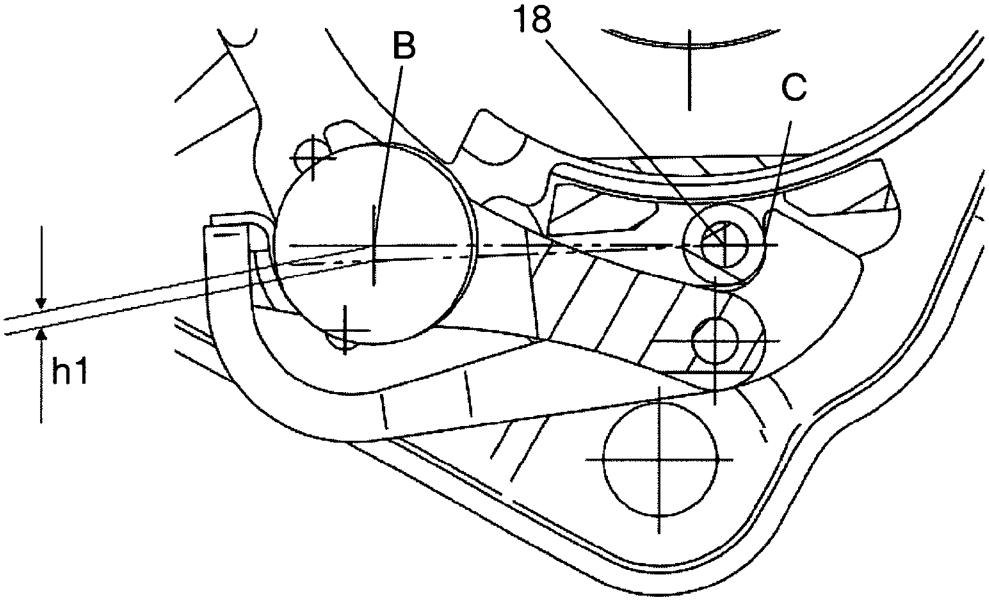
Figure 5:
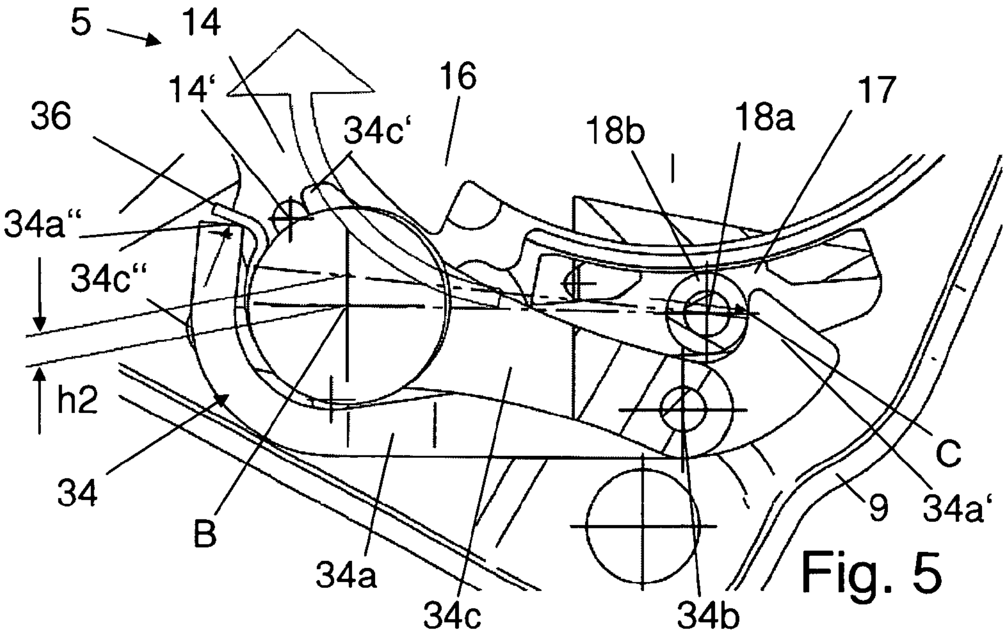
Figure 6:
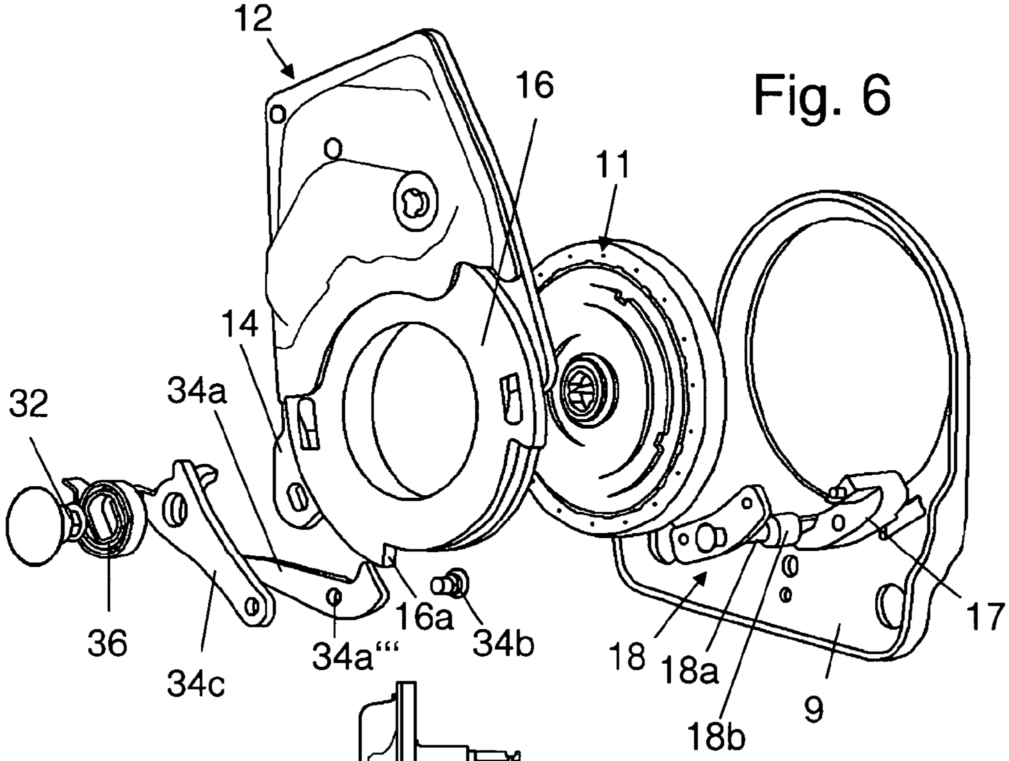
Figure 7:
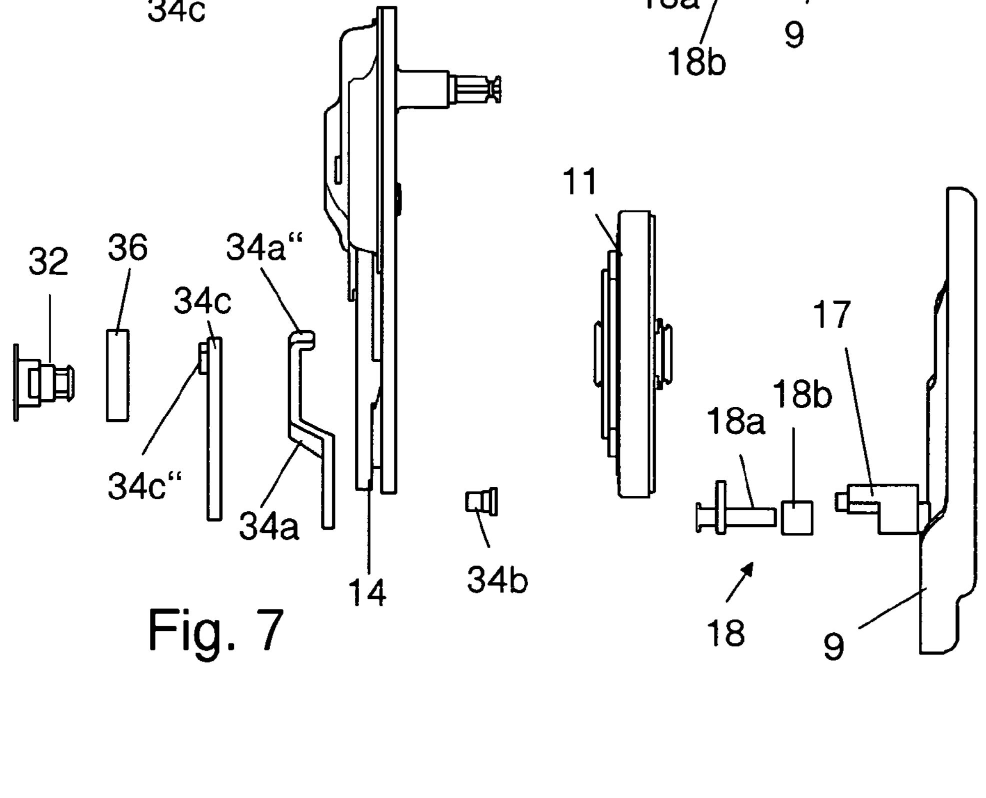
Figure 10:
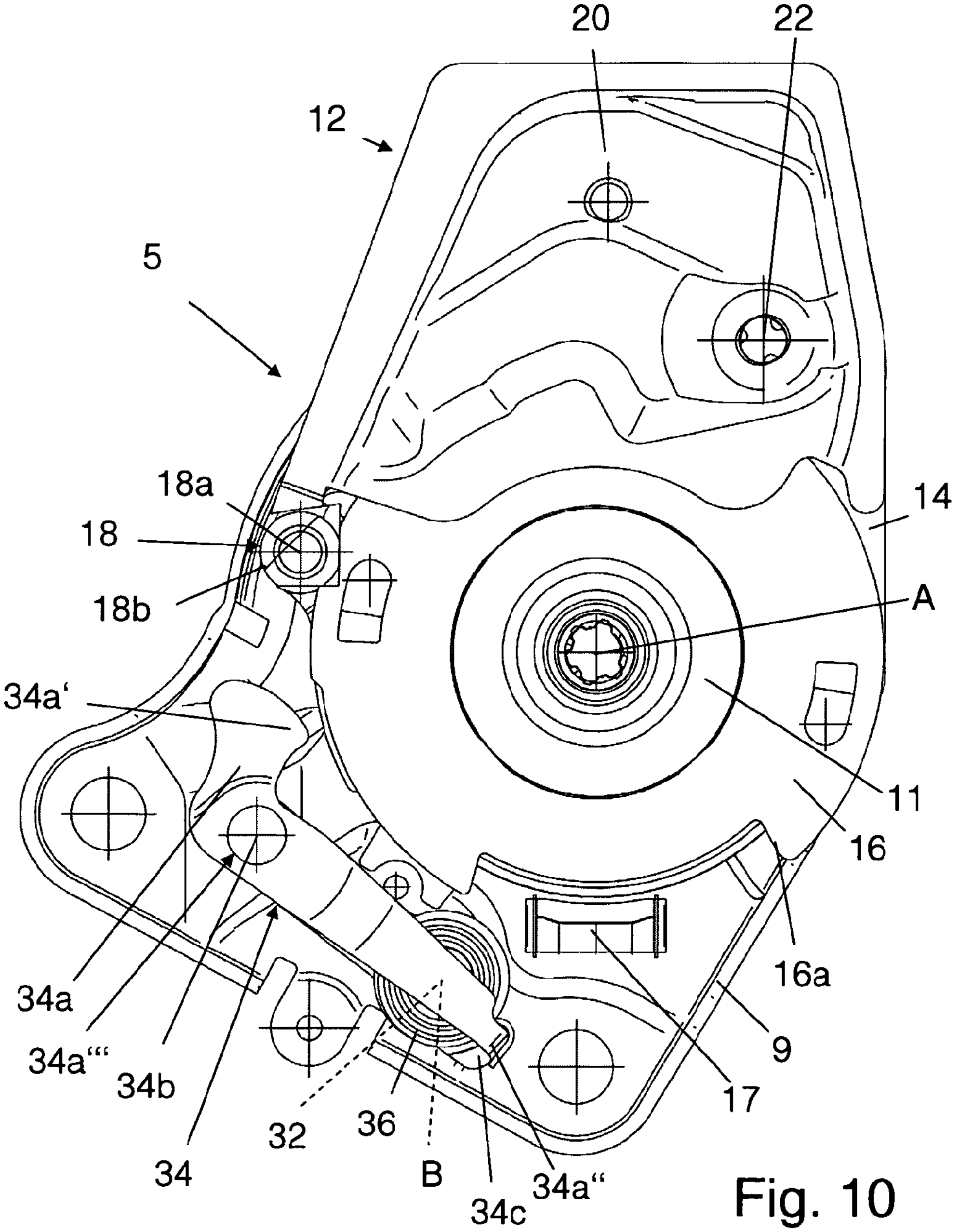
Figure 11:
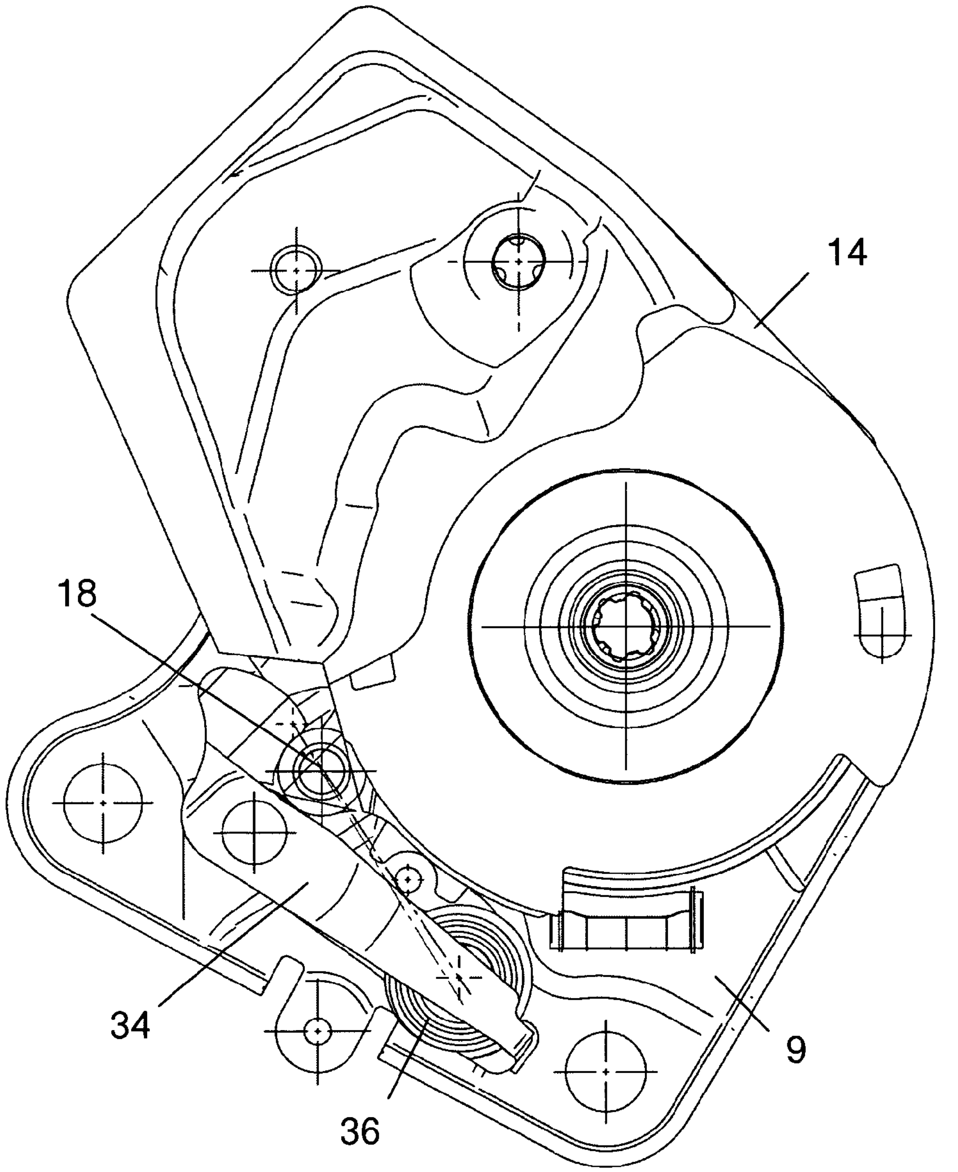
Figure 12:
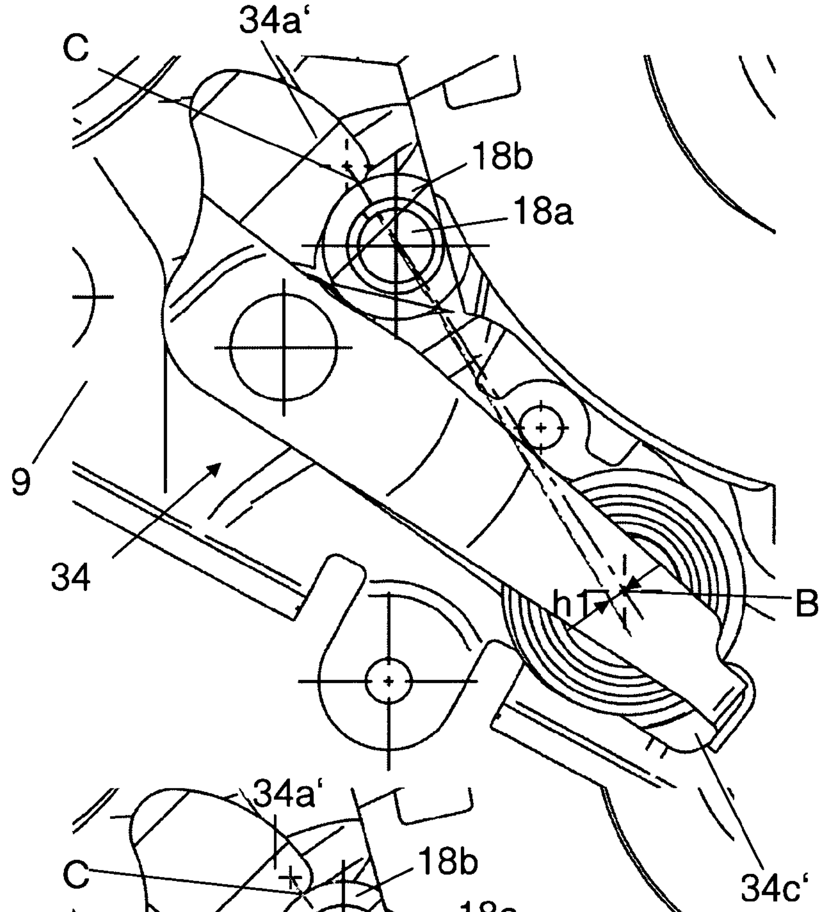
Figure 14:
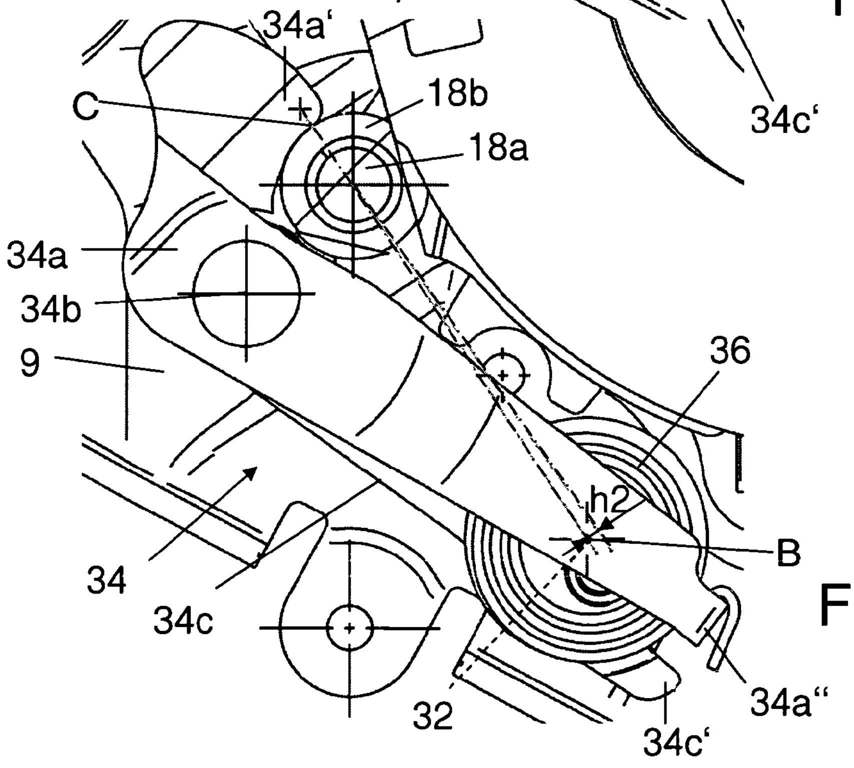
Figure 13:
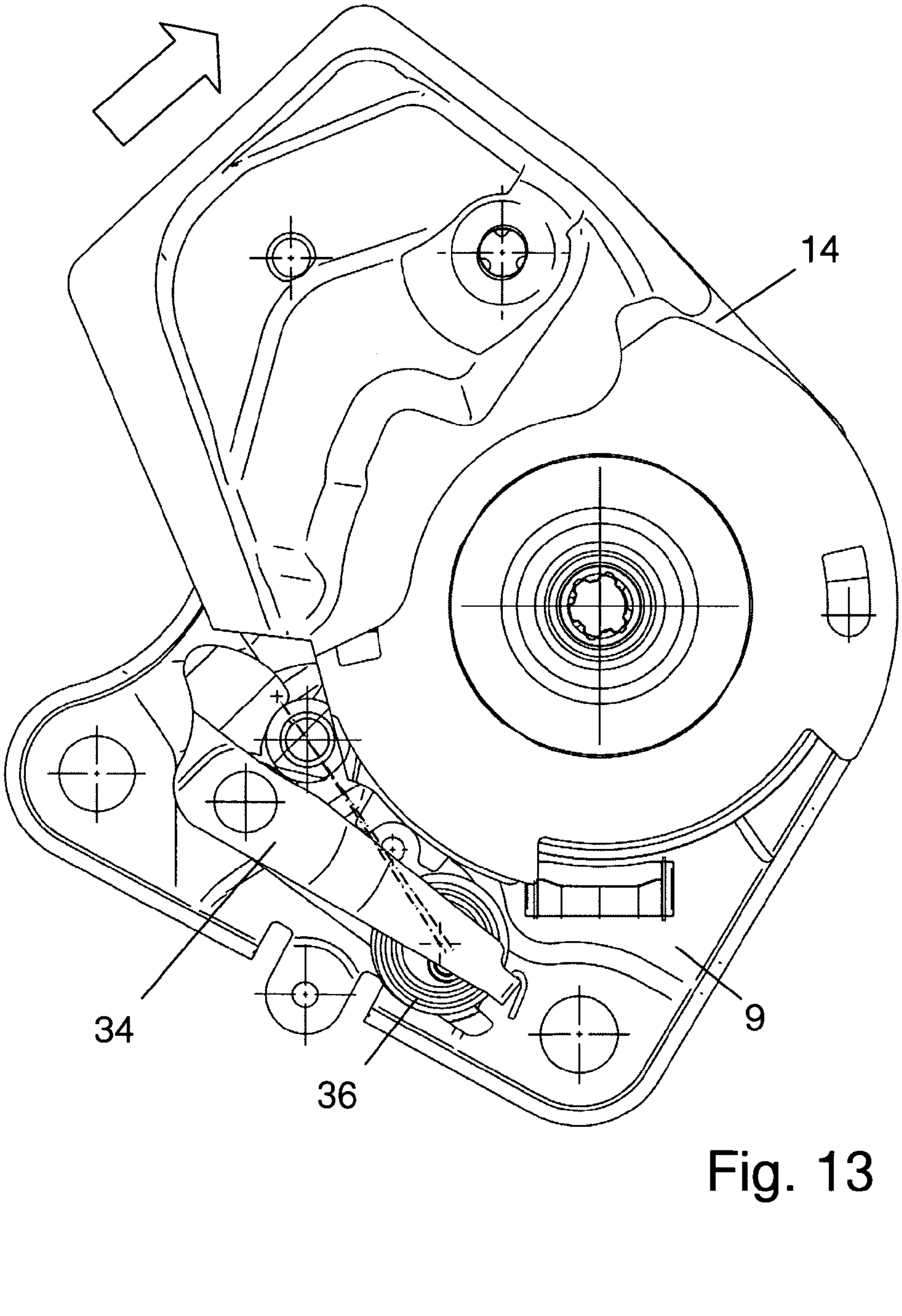
Figure 15:
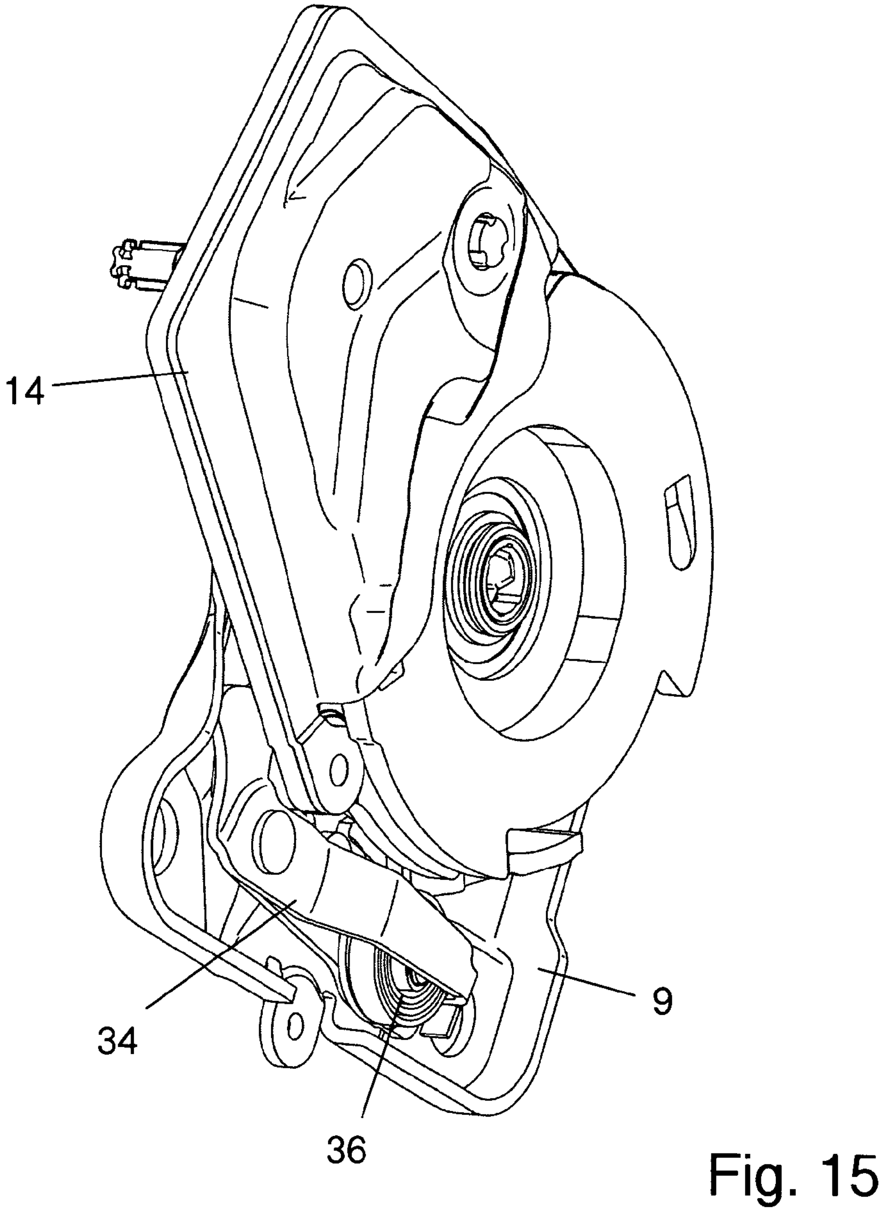
Figure 16:
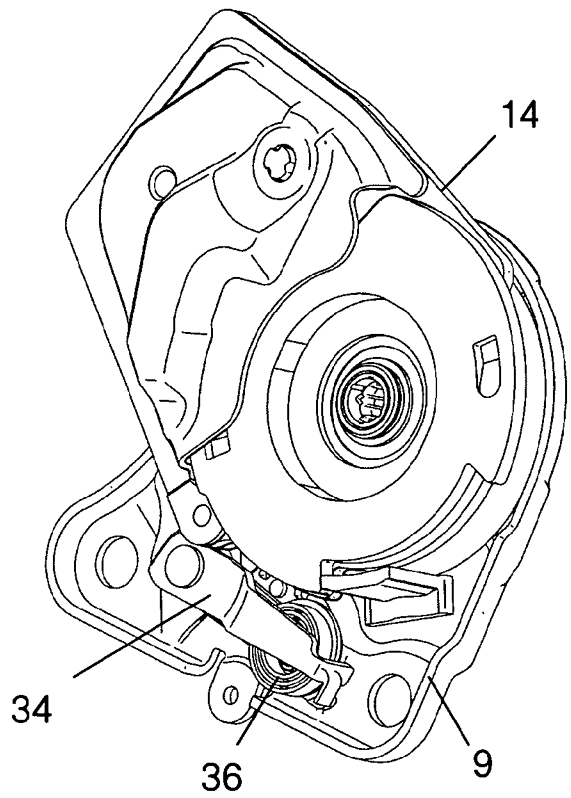
Figure 17:
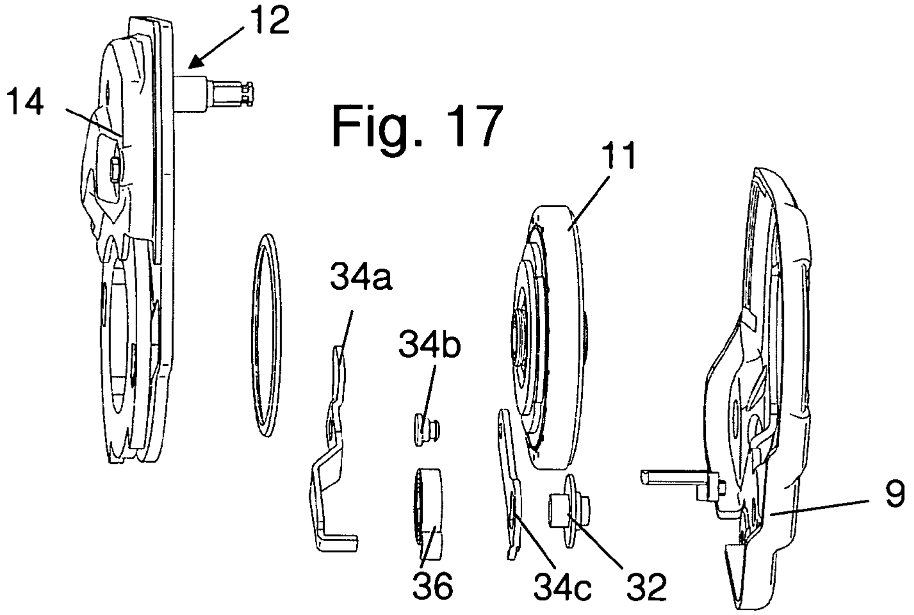
Figure 18:
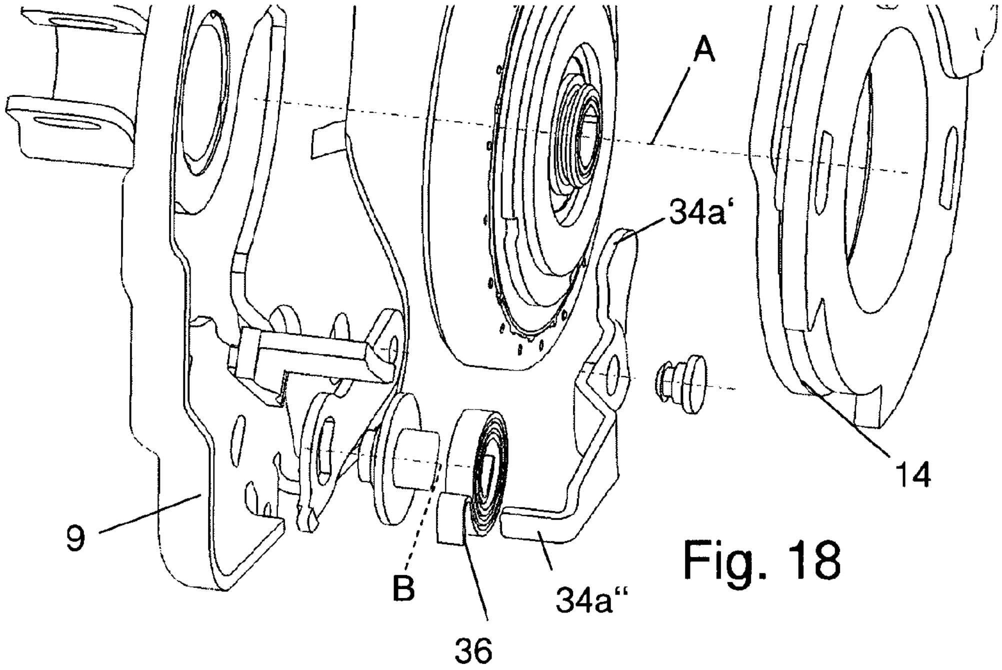
Figure 19:
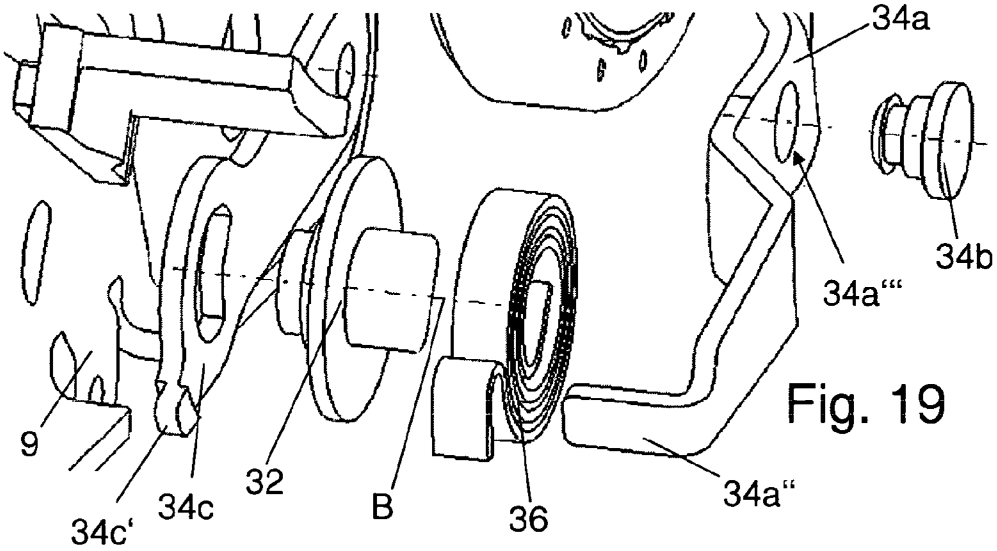
Figure 20:
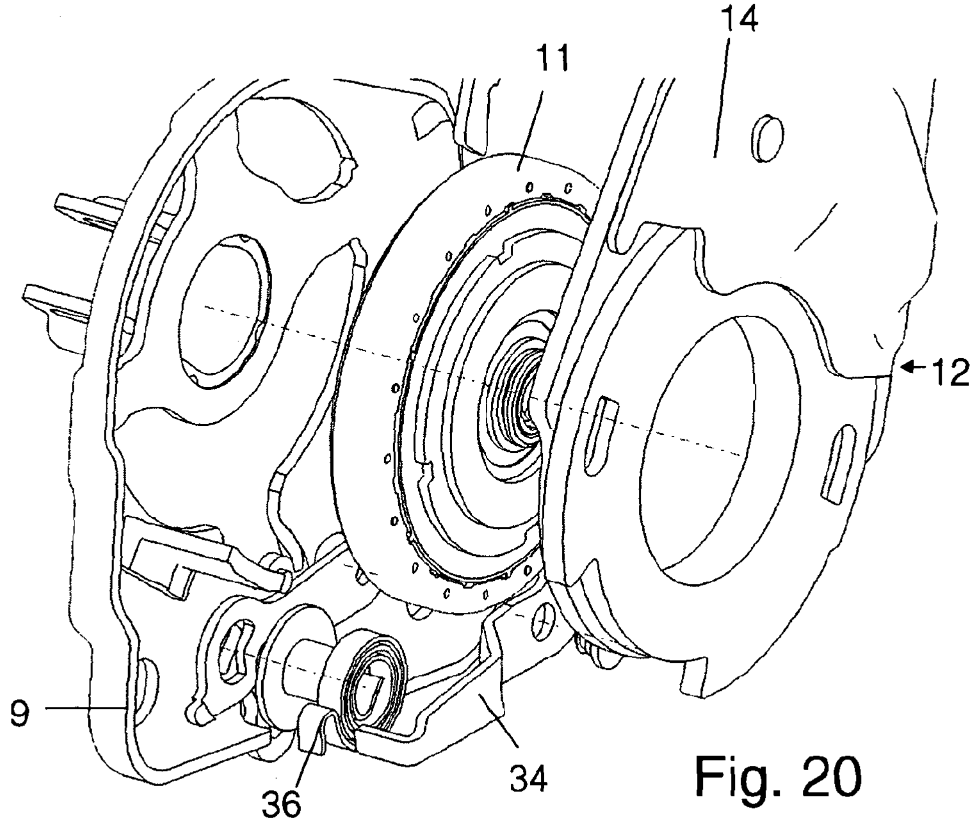
Figure 21:
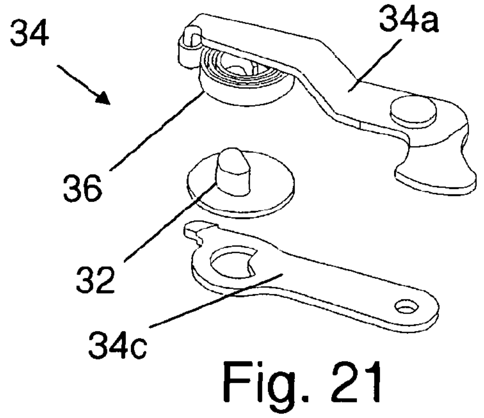
Figure 22:
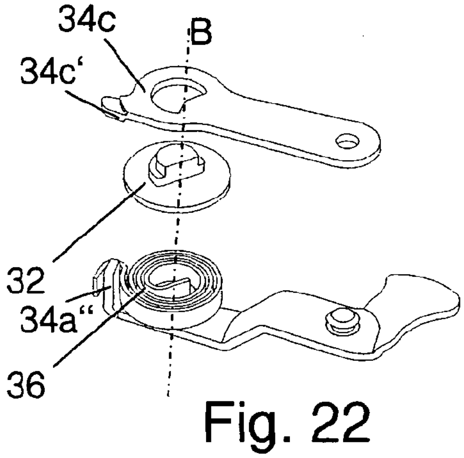

The invention is explained in more detail below with reference to two exemplary embodiments which are illustrated in the drawing, in which FIG. 1 shows a view of the first exemplary embodiment in the use position from the axial direction, FIG. 2 shows a view of the exemplary embodiment according to FIG. 1 in the freely pivoted, locked position, FIG. 3 shows a view, corresponding to FIG. 2, in the freely pivoted position, after the pivoting-back has been initiated, and FIG. 4 shows a detailed view of FIG. 2, FIG. 5 shows a detailed view of FIG. 3, FIG. 6 shows a first exploded illustration of the fitting in a perspective illustration, FIG. 7 shows a second exploded illustration of the fitting from the side, FIG. 8 shows a third exploded illustration of the fitting from a further direction, FIG. 9 shows a schematic side view of a vehicle seat, FIG. 10 shows a view of the second exemplary embodiment in the use position from the axial direction, FIG. 11 shows a view of the exemplary embodiment corresponding to FIG. 10 in the freely pivoted, locked position, FIG. 12 shows a detailed view of FIG. 11, FIG. 13 shows a view, corresponding to FIG. 11, in the freely pivoted position, after the pivoting-back has been initiated, FIG. 14 shows a detailed view of FIG. 13, FIG. 15 shows a perspective view of the fitting from FIG. 10 in the freely pivoted, locked position, FIG. 16 shows another perspective view of the fitting from FIG. 10 in the freely pivoted, locked position, FIG. 17 shows a slightly perspective exploded illustration of the fitting from FIG. 10, FIG. 18 shows another perspective exploded illustration of the fitting from FIG. 10, FIG. 19 shows a detailed view of FIG. 18, FIG. 20 shows another perspective exploded illustration of the fitting from FIG. 10, FIG. 21 shows a perspective exploded illustration of essential parts of the catch arrangement from FIG. 10, and FIG. 22 shows another perspective exploded illustration of essential parts of the catch arrangement from FIG. 10.

A vehicle seat 1 for a two-door motor vehicle has a respective fitting 5 on both of its sides for the inclination adjustment of its backrest 2 relative to its seat part 3, i.e. the slow, precise angular alteration between a plurality of use positions and the free-pivoting, i.e. the rapid, large angular alteration from the use position into a freely pivoted position as a specific non-use position. For the inclination adjustment function, a handwheel 7 is provided on the outside of the vehicle seat 1 on one of the fittings 5 and a shaft which is connected to the handwheel 7 is provided between the two fittings 5 while, for the free-pivoting function, a free-pivoting operating element 8, for example a hand lever, is movably attached to the backrest 2.

In a modification of the exemplary embodiment, the fitting lower part may also be an integral part of the structure of the seat part 3.

Each fitting 5 comprises a fitting lower part 9 which serves for fastening the fitting 5 to the structure of the seat part 3 ("fixed on the seat part"), a backrest inclination adjustment fitting, referred to in short hereinafter as an adjustment fitting 11, and a free-pivoting unit 12 which, for its part, has a free-pivoting part 14 which serves for fastening the fitting to the structure of the backrest 2 ("fixed on the backrest"). Reference is also made to the fitting lower part 9 and the free-pivoting part 14 as fitting parts owing to the function thereof during the free-pivoting movement.

In terms of structure, the adjustment fitting 11 is designed as a disk-shaped unit, as described, for example, in DE 101 05 282 B4 or DE 20 2010 012 612 U1, the disclosure thereof in this regard being expressly incorporated into the invention. The adjustment fitting 11 has two fitting parts which are rotatable relative to each other and are held together in the axial direction by means of a clamping ring. In the exemplary embodiment, the adjustment fitting 11 is designed as a geared fitting, i.e. the two fitting parts of the adjustment fitting 11 are connected to each other in transmission by means of an eccentric epicyclic gear—which is self-locking here—and which, in the present case, permits a play-free fixing of the two fitting parts of the adjustment fitting 11, and, for the stepless adjustment, forces a relative rotation of the two fitting parts of the adjustment fitting 11 with a superimposed wobble motion. Such a geared fitting is described, for example, in DE 44 36 101 A1 or DE 20 2010 012 621 U1, the disclosure thereof in this regard being expressly incorporated into the invention. The rotation of the handwheel 7 drives the geared fitting. However, other geared fittings and also latching fittings, in particular memorized latching fittings, can also be used as an adjustment fitting 11. In the latter case, a small rotation of the handwheel 7 or of a lever provided as an alternative unlocks the latching fitting. The interior of such a latching fitting is described, for example, in WO 00/44582 A1 or DE 20 2009 016 989 U1, the disclosure of which in this regard being expressly incorporated into the invention. The adjustment fitting 11 is fixedly connected by one of its two fitting parts and the clamping ring to the fitting lower part 9, i.e. one of the two fitting parts of the adjustment fitting 11 is fixed on the seat part. To this end, the fitting lower part 9 has a circular receptacle for the adjustment fitting 11.

The free-pivoting unit 12 has an—approximately annular—latching element 16, relative to which the free-pivoting part 14 is rotatably mounted about an axis A, wherein the latching element 16 is connected for conjoint rotation, in the present case welded, to that fitting part of the adjustment fitting 11 that faces the latching element. The axis A and its position within the vehicle seat 1 define the directional information used in the present case. Since the axis A—possibly apart from the wobble motion—coincides with the central axis of the adjustment fitting 11, central free-pivoting is involved in the present case. A mating element 17 is fastened to the fitting lower part 9 and protrudes axially therefrom. On one part of its periphery, the latching element 16 has a recess **16*a* which is offset radially inward, is delimited by a respective step and within which the mating element 17 is arranged. By interaction of the mating element 17 with the steps of the latching element 16, the angular adjustment range for the adjustment inclination of the use position of the backrest 2 is delimited. The latching element 16 (and therefore the free-pivoting unit 12) is connected fixedly to that fitting part of the two fitting parts of the adjustment fitting 11 that is not fixed on the seat part. The free-pivoting unit is connected to the adjustment fitting 11**, for example, by laser welding.

For the mounting of the free-pivoting part 14, the latching element 16 in the present case has a collar which protrudes axially with respect to the axis A and on which the free-pivoting part 14 is rotatably mounted. A cover 20 which is connected to the free-pivoting part 14 defines, on the one hand, a construction space between itself and the free-pivoting part 14 protruding upward over the latching element 16. On the other hand, the lower edge of the cover 20 is designed as a retaining clip and engages over the latching element 16, optionally with the interposition of a slider, for example made of plastic. The cover 20 therefore serves as further axial securing of the free-pivoting part 14.

A locking catch—not illustrated in the present case—, which can be locked to the latching element 16, is mounted pivotably on the free-pivoting part 14 by means of a first bearing pin 22. Said locking catch locks the backrest in the use positions, i.e. in the positions in which it is not freely pivoted. A locking catch of this type is known, for example, from DE 10 2006 044 489 A1, the disclosure thereof in this regard being expressly incorporated into the invention. The locking catch and the latching element 16 are in contact at an angle outside the self-locking range. The locking catch is secured by a catch element and a tensioning element, which are not illustrated in the present case and the functioning of which is described in DE 44 39 644 A1, the disclosure thereof in this regard being expressly incorporated into the description. The tensioning element bears with an eccentrically curved tensioning surface at an angle outside the self-locking range against the locking catch under prestress. As a result, the free-pivoting part 14 is locked in a play-free manner to the latching element 16. In the normal case, the catch element is arranged at a small distance (with reference to the dimensions of the locking catch) from the locking catch and supports the locking catch in the event of a crash.

In the present exemplary embodiment, the two fittings 5 on the two vehicle seat sides differ slightly in design by a fixing of the backrest 2 in the freely pivoted position being provided on one vehicle seat side. The fitting 5 on the last-mentioned vehicle seat side is described in more detail below.

In the case of this fitting 5, a multi-part catch arrangement 34 designed in the manner of a buckling lever is mounted pivotably on the free-pivoting part 14 by means of a second bearing pin 32. The catch arrangement 34 has a catch 34*a* with a free end region 34*a*' designed in the manner of a hook, an opposite end 34*a*" which is connected to one end of a spring 36 designed as a spiral spring, and an articulated bearing point 34*a*''', on which said catch arrangement is connected via a pin 34*b* to a lever 34*c* bearing the catch 34*a*.

The lever 34*c* is mounted pivotably on the bearing pin 32 which is fixed on the free-pivoting part and on the stem of which the spring 36 is furthermore positioned in such a manner that the inner end of the spring 36 is arranged fixed on the bearing pin. The center longitudinal axis of the bearing pin 32 forms the pivot axis B of the lever 34*c*. At the end close to the bearing pin, the lever 34*c* has a first projection 34*c*' in the form of an outwardly protruding arm which can interact with a stop 14' formed on the free-pivoting part 14 and which limits the pivoting movement of the lever 34*c* about the bearing pin 32 in the direction of the axis A. Furthermore, the lever 34*c* has a second projection 34*c*" in the form of a further outwardly protruding arm which, likewise at the end close to the bearing pin, is arranged somewhat spaced apart from the first projection 34*c*'. Said second projection 34*c*" can interact with the spring-side end 34*a*" of the catch 34*a*.

The catch arrangement 34 is prestressed against the stop 14' by the first projection 34*c*' of the lever 34*c* by means of the spring 36 and, during the free-pivoting of the backrest 2, slides with its free end (end region 34*a*' of the catch 34*a*) pivoting upward along protruding contours of the mating element 17.

The vehicle seat 1 can be adjusted longitudinally, i.e. can be adjusted in the seat longitudinal position, by means of a longitudinal adjuster 41. The longitudinal adjuster 41 having two pairs of seat rails can be unlocked for this purpose by means of a handle 43 and automatically locks after the handle 43 is released. However, the longitudinal adjuster 41 is also unlocked for the free-pivoting of the backrest 2, and therefore the vehicle seat 1 can be moved forward (by means of the longitudinal adjuster 41) in order, in addition to the free-pivoting of the backrest 2, to facilitate access to the rear. In this case, the longitudinal adjuster 41 is unlocked directly by means of the free-pivoting operating element 8 or indirectly by an unlocking ring being provided in the fitting 5 on the vehicle seat side without the catch arrangement 34, said unlocking ring being carried along in a manner known per se during the pivoting forward of the backrest 2 and then activating the locking of the longitudinal adjuster 41 by means of a Bowden cable or the like.

The free-pivoting of the backrest 2, which is triggered by means of the free-pivoting operating element 8, begins with the unlocking of the free-pivoting part 14 on both vehicle seat sides. The locking catch (not illustrated) is raised from the latching element 16. With the pivoting movement of the backrest 2 forward, the catch arrangement 34 slides with its free end along the latching element 16 and then reaches the mating element 17. A suitable contour, in particular an oblique contour, of the catch arrangement 34 ensures that the catch arrangement 34, which has come into contact with the mating element 17, slightly pivots upward with the further pivoting movement of the backrest 2 and slides along the lower side of the mating element 17. In this case, the catch arrangement 34 is held substantially in a rigid arrangement.

After the passing by of a locking pin 18*a*, which, in the present case, is formed with a slide-mounted ring 18*b* in order to reduce the friction and which, together with the ring 18*b*, form a catch locking element 18 which, according to the first exemplary embodiment, forms part of the mating element 17 of multi-part design, but may, in principle, be formed separately therefrom, the bearing contour for the catch arrangement 34 springs radially back. By means of its prestressing as a consequence of the spring force of the spring 36, the catch arrangement 34 now drops—radially inward—behind the ring 18*b*, which is supported by the locking pin 18*a*, with the cylindrical outer surface and makes contact with said ring by means of a hook-like contour, wherein a linear contact region C is provided. The pivoting movement of the backrest 2 is ended and the free-pivoting part 14 (and therefore the backrest 2) is fixed in relation to the fitting lower part 16. The pivoted-forward backrest 2 is now in the freely pivoted position which permits unhindered access to the rear. At the same time, the vehicle seat 1 is in a front seat longitudinal position.

In said unloaded locked state of the backrest 2 that is illustrated in FIG. 4, the catch arrangement 34 is "rigid", i.e. the catch arrangement 34 acts as a catch of single-part design, since, by means of the offset h1 (illustrated in FIG. 4) of the center point of rotation (pivot axis B) and the perpendicular in the contact point of the catch 34*a*—ring outer surface (contact region C), a closing torque is exerted (in FIG. 4 acting on the catch 34*a* in an anticlockwise direction), as a result of which the catch 34*a* is held in engagement with the mating element 17, i.e. the catch 34*a* has a self-locking contour in this state. In the present case, the catch 34*a* is arranged with at least a partial region on the fitting outer side of the pivot axis B.

In order to return into the previously assumed use position, the vehicle seat 1 is first of all moved rearward again, for example by pulling on the backrest 2. When the previously assumed seat longitudinal position is reached, the torque acting on the backrest 2 bears fully against the catch arrangement 34, where it acts in an opening manner—as described below.

If, during the pivoting-back of the backrest 2, a corresponding force on the end region 34*a*' of the catch 34*a* increases, a torque acts on the catch 34*a* about the bearing point 34*a*'''. This torque increases to an extent until it is greater than the torque of the spring 36 about the bearing point 34*a*''', and therefore the end 34*a*" is released from the projection 34*c*" of the lever 34*c* and the catch arrangement 34 stretches, as is apparent from FIG. 5. By means of the stretching of the catch arrangement 34 owing to the loading of the backrest, the perpendicular to the contact region C of the catch 34*a* forms an opening torque about the rotational point of the catch, i.e. the pivot axis B, caused by the offset h2.

The backrest loading to be applied is primarily determined by the predeterminable force of the spring 36 and secondarily by the friction in the ring 18*b*.

The offset h1 which decreases as the backrest load increases changes into an increasing offset h2, and the offset h2 is increased further until a sufficient opening torque of the catch 34*a* is achieved in order to overcome the stiction of the bearing on the ring 18*b*. As the stiction spreads upward, the backrest loading and consequently the spring stressing are simply further increased, and the catch 34*a* then opens at a relatively large offset h2 and frees the backrest 2.

Upon reaching the previously assumed use position, the locking catch (not illustrated) drops again into the latching element 16, and therefore the free-pivoting part 14 and therefore the fitting 5 are locked again.

According to the exemplary embodiment illustrated in the drawing, the mating element 17 has said catch locking element 18 with the locking pin 18*a* thereof and said ring 18*b*, which is mounted on the locking pin 18*a* with little friction. Therefore, no stiction (sliding friction) has to be overcome for a relative movement of the catch 34*a* with respect to the ring 18*b*, but rather a type of rolling movement takes place between the catch 34*a* and ring 18*b*. In the ideal case, the rolling friction is negligibly small.

As described above, the ring 18*b* can be mounted on the locking pin 18*a* by means of a sliding bearing, but it may likewise be mounted by means of a rolling bearing, for example a needle bearing or ball bearing. In order to keep the catch-ring friction as small as possible, the locking pin 18*a* preferably has an outside diameter which is at maximum half the size of the outside diameter of the ring 18*b* arranged on the outside, in order, by means of this support, to reduce the dependency on the size of the stiction between the ring 18*b* and the locking pin 18*a*.

In principle—given a suitable configuration of the surfaces encountering one another—it is also possible for the catch 34*a* to bear directly against a corresponding outer surface of the pin or other catch locking element, i.e. a sliding bearing can be provided in the contact region C between the catch and catch locking element, but said sliding bearing should have a low coefficient of stiction for proper functioning of the catch arrangement.

Although a catch arrangement which is arranged on the free-pivoting part and interacts with a mating element arranged on the fitting lower part is described above, a kinematic reversal of said arrangement may also be undertaken such that a catch arrangement which is fixed on the fitting lower part interacts with a mating element fixed on the free-pivoting part. Also in this case, rolling relative movements between the catch of the catch arrangement and the mating element are particularly preferably provided.

The second exemplary embodiment is explained in more detail below with reference to FIGS. 10 to 17. In this case, identical or identically acting elements are provided with the same reference numbers as in the first exemplary embodiment. The arrangement on a vehicle seat corresponds in turn to the illustration of FIG. 9.

Also according to the second exemplary embodiment, each fitting 5 comprises a fitting lower part 9 which serves for fastening the fitting 5 to the structure of the seat part 3, a backrest inclination fitting, referred to in short hereinafter as an adjustment fitting 11, and a free-pivoting unit 12 which, for its part, has a free-pivoting part 14 which serves for fastening the fitting 5 to the structure of the backrest 2. Reference is also made to the fitting lower part 9 and the free-pivoting part 14 as fitting parts owing to the function thereof during the free-pivoting movement.

The adjustment fitting 11 is designed in a structural respect corresponding to the first exemplary embodiment, and therefore reference is made to the description according to the first exemplary embodiment.

According to the first exemplary embodiment, the free-pivoting unit 12 has an—approximately annular—latching element 16, relative to which the free-pivoting part 14 is rotatably mounted about an axis A, wherein the latching element 16 is connected for conjoint rotation, in the present case welded, to that fitting part of the adjustment fitting 11 that faces the latching element. The axis A and its position within the vehicle seat 1 define the directional information used in the present case. Since the axis A—possibly apart from the wobble motion—coincides with the central axis of the adjustment fitting 11, central free-pivoting is involved in the present case. A mating element 17 is fastened to the fitting lower part 9 and protrudes axially therefrom. On one part of its periphery, the latching element 16 has a recess 16*a* which is offset radially inward, is delimited by a respective step and within which the mating element 17 is arranged. By interaction of the mating element 17 with the steps of the latching element 16, the angular adjustment range for the adjustment inclination of the use position of the backrest 2 is delimited. The latching element 16 (and therefore the free-pivoting unit 12) is connected fixedly to that fitting part of the two fitting parts of the adjustment fitting 11 that is not fixed on the seat part. The free-pivoting unit is connected to the adjustment fitting 11, for example, by laser welding.

For the mounting of the free-pivoting part 14, the latching element 16 in the present case has a collar which protrudes axially with respect to the axis A and on which the free-pivoting part 14 is rotatably mounted. A cover 20 which is connected to the free-pivoting part 14 defines, on the one hand, a construction space between itself and the free-pivoting part 14 protruding upward over the latching element 16. On the other hand, the lower edge of the cover 20 is designed as a retaining clip and engages over the latching element 16, optionally with the interposition of a slider, for example made of plastic. The cover 20 therefore serves as further axial securing of the free-pivoting part 14.

A locking catch—not illustrated in the present case—, which can be locked to the latching element 16, is mounted pivotably on the free-pivoting part 14 by means of a first bearing pin 22. Said locking catch locks the backrest in the use positions, i.e. in the positions in which it is not freely pivoted. A locking catch of this type is known, for example, from DE 10 2006 044 489 A1, the disclosure thereof in this regard being expressly incorporated into the invention. The locking catch and the latching element 16 are in contact at an angle outside the self-locking range. The locking catch is secured by a catch element and a tensioning element, which are not illustrated in the present case and the functioning of which is described in DE 44 39 644 A1, the disclosure thereof in this regard being expressly incorporated into the description. The tensioning element bears with an eccentrically curved tensioning surface at an angle outside the self-locking range against the locking catch under prestress. As a result, the free-pivoting part 14 is locked in a play-free manner to the latching element 16. In the normal case, the catch element is arranged at a small distance (with reference to the dimensions of the locking catch) from the locking catch and supports the locking catch in the event of a crash.

Also in this second exemplary embodiment, the two fittings 5 on the two vehicle seat sides differ slightly in design by a fixing of the backrest 2 in the freely pivoted position being provided on one vehicle seat side. The fitting 5 on the last-mentioned vehicle seat side is described in more detail below.

In the case of this fitting 5, a multi-part catch arrangement 34 designed in the manner of a buckling lever is mounted pivotably on the fitting lower part 9 by means of a second bearing pin 32. The catch arrangement 34 has a catch 34*a* with a free end region 34*a'* designed in the manner of a hook and can enter into engagement with a ring 18*b* mounted on a locking pin 18*a*, with an opposite end 34*a''* which is connected to one end of a spring 36 designed as a spiral spring, and an articulated bearing point 34*a*''', on which said catch arrangement is connected via a pin 34*b* to a lever 34*c* bearing the catch 34*a*. Also in this case, reference is made to the entirety of the locking pin 18*a* and ring 18*b* as the catch locking element 18.

The lever 34*c* is mounted pivotably on the bearing pin 32 attached to the fitting lower part 9. In this case, the bearing pin 32 has a stem with four regions. On the fitting lower part side, it has a fastening region with an approximately crescent-shaped cross section, with which it is also attached nonrotatably in a corresponding crescent-shaped opening on the fitting lower part 9. Adjacent thereto, a bearing region with a somewhat larger, likewise crescent-shaped cross section is provided, on which the lever 34*c* sits with an approximately 3/4-circular opening. The (theoretical) center longitudinal axis of the bearing pin 32 forms the pivot axis B of the lever 34*c*. In contrast to the first exemplary embodiment, in the present case, the pivoting movement of the lever 34*c* about the bearing pin 32 is limited by the configuration of the opening in the fitting lower part 9 and not by a stop formed on the free-pivoting part. A circular flange region is provided adjacent to the bearing region of the bearing pin 32, said flange region separating the bearing region for the lever 34*c* from the spring seat on which the spring 36, which is bent in a spiral manner, is positioned in such a manner that the inner end of the spring 36 is arranged fixed on the bearing pin, wherein the outer end of the spring 36 is bent over outward in a hook-shaped manner.

At the end close to the bearing pin, the lever 34*c*, which is mounted on the bearing pin 32, has a projection 34*c*' in the form of an outwardly projecting arm which forms a contact surface for the spring-side end 34*a*'' of the catch 34*a*, and against which said end 34*a*'' is prestressed by the spring 36. The other end region of the lever 34*c* has an opening in which the pin 34*b* supporting the catch 34*a* is arranged, i.e. this end of the lever 34*c* bears the catch 34*a*. The spring 36 preferably acts on the end 34*a*'' at as large a spacing as possible from the bearing point 34*a*'''.

In the present case, because of the frictional forces, the catch arrangement 34 is freely movable with respect to the lever 34*c*, but the end region 34*a*' of the catch 34*a* is prestressed by the spring 36 relative to the lever 34*c* in the direction of the free-pivoting part 14, on which said locking pin 18*a* together with its ring 18*b* sit. Of course, an additional spring prestressing the catch arrangement may also be provided in order to prevent rattling.

In the following, the function of the catch arrangement 34 is discussed in more detail. In a manner corresponding to the vehicle seat 1 according to the first exemplary embodiment, the vehicle seat 1 can be adjusted longitudinally, i.e. can be adjusted in the seat longitudinal position, by means of a longitudinal adjuster 41. The longitudinal adjuster 41 having two pairs of seat rails can be unlocked for this purpose by means of a handle 43 and automatically locks after the handle 43 is released. However, the longitudinal adjuster 41 is also unlocked for the free-pivoting of the backrest 2, and therefore the vehicle seat 1 can be moved forward (by means of the longitudinal adjuster 41) in order, in addition to the free-pivoting of the backrest 2, to facilitate access to the rear. In this case, the longitudinal adjuster 41 is unlocked directly by means of the free-pivoting operating element 8 or indirectly by an unlocking ring being provided in the fitting 5 on the vehicle seat side without the catch arrangement 34, said unlocking ring being carried along in a manner known per se during the pivoting forward of the backrest 2 and then activating the locking of the longitudinal adjuster 41 by means of a Bowden cable or the like.

The free-pivoting of the backrest 2, which is triggered by means of the free-pivoting operating element 8, begins with the unlocking of the free-pivoting part 14 on both vehicle seat sides. The locking catch (not illustrated) is raised from the latching element 16. With the pivoting movement of the backrest 2 forward, the catch arrangement 34 enters with its free end into contact with the locking pin 18*a* which, in the present case, is formed with a slide-mounted ring 18*b* in order to reduce the friction.

If the ring 18*b* enters into contact with the catch arrangement 34, or put more precisely the end region 34*a*' of the catch 34*a*, an oblique contour of the end 34*a*' ensures that the catch arrangement 34 pivots—if not carried out—entirely about the pin 32 attached to the fitting lower part 9 until the lever 34*c* passes into its corresponding end position, and the catch 34*a* subsequently pivots upward counter to the force of the spring 36, i.e. the end 34*a*'' moves the hook-shaped end region of the spring 36 away from the projection 34*c*' of the lever 34*c*.

After the passing by of the locking pin 18*a* which, in the present case, is formed with said slide-mounted ring 18*b* in order to reduce the friction, the contact contour for the catch arrangement 34 springs radially back. By means of its prestressing as a consequence of the spring force of the spring 36, the catch arrangement 34 now drops—radially inward—behind the ring 18*b*, which is supported by the locking pin 18*a*, with the cylindrical outer surface and makes contact with said ring by means of a hook-like contour, wherein a linear contact region C is provided. The pivoting movement of the backrest 2 is ended and the free-pivoting part 14 (and therefore the backrest 2) is fixed in relation to the fitting lower part 16. The pivoted-forward backrest 2 is now in the freely pivoted position which permits unhindered access to the rear. At the same time, the vehicle seat 1 is in a front seat longitudinal position.

In said unloaded locked state of the backrest 2 that is illustrated in FIGS. 11 and 12, the catch arrangement 34 is "rigid", i.e. the catch arrangement 34 acts as a catch of single-part design, since, by means of the offset h1 (illustrated in FIG. 12) of the center point of rotation (pivot axis B) and the perpendicular in the contact point of the catch 34*a*—ring outer surface (contact region C), a closing torque is exerted (in FIG. 12 acting on the catch 34*a* in a clockwise direction), as a result of which the catch 34*a* is held in engagement with the mating element 18, i.e. the catch 34*a* has a self-locking contour in this state. In the present case, the catch 34*a* is arranged with at least a partial region on the fitting outer side of the pivot axis B.

In order to return into the previously assumed use position, the vehicle seat 1 is first of all moved rearward again, for example by pulling on the backrest 2. When the previously assumed seat longitudinal position is reached, the torque acting on the backrest 2 bears fully against the catch arrangement 34, where it acts in an opening manner—as described below.

If, during the pivoting-back of the backrest 2, the corresponding force on the end region 34*a*' of the catch 34*a* increases, a torque acts on the catch 34*a* about the bearing point 34*a*'''. This torque increases to an extent until it is greater than the torque of the spring 36 about the bearing point 34*a*''', and therefore the end 34*a*'' is released from the projection 34*c*' of the lever 34*c* and the catch arrangement 34 stretches, as is apparent from FIGS. 13 and 14. By means of the stretching of the catch arrangement 34 owing to the loading of the backrest, the perpendicular to the contact region C of the catch 34*a* forms an opening torque about the rotational point of the catch, i.e. the pivot axis B, caused by the offset h2. By selection of the position of the spring 36 and the spring constants, the required force for opening the catch arrangement 34 can be adjusted.

The backrest loading to be applied is primarily determined by the predeterminable force of the spring 36 and secondarily by the friction in the ring 18*b*.

The offset h1 which decreases as the backrest load increases changes into an increasing offset h2, and the offset h2 is increased further until a sufficient opening torque of the catch 34*a* is achieved in order to overcome the stiction of the bearing on the ring 18*b*. As the stiction spreads upward, the backrest loading and consequently the spring stressing are simply further increased, and the catch 34*a* then opens at a relatively large offset h2 and frees the backrest 2.

Upon reaching the previously assumed use position, the locking catch (not illustrated) drops again into the latching element 16, and therefore the free-pivoting part 14 and therefore the fitting 5 are locked again.

According to the exemplary embodiments illustrated in the drawing, said locking pin 18*a* has said ring 18*b* which is mounted on the locking pin 18*a* with little friction. Therefore, no stiction (sliding friction) has to be overcome for a relative movement of the catch 34*a* with respect to the ring 18*b*, but rather a type of rolling movement takes place between the catch 34*a* and ring 18*b*. In the ideal case, the rolling friction is negligibly small.

As described above, the ring 18*b* can be mounted on the locking pin 18*a* by means of a sliding bearing, but it may likewise be mounted by means of a rolling bearing, for example a needle bearing or ball bearing. In order to keep the catch-ring friction as small as possible, the locking pin 18*a* preferably has an outside diameter which is at maximum half the size of the outside diameter of the ring 18*b* arranged on the outside, in order, by means of this support, to reduce the dependency on the size of the stiction between the ring 18*b* and the locking pin 18*a*.

In principle, however, a two-part configuration of the catch locking element 18 may also be omitted, in particular if a material pairing which is particularly low in friction is present.

In a modification of the first or second exemplary embodiment, the seat does not have a longitudinal adjustor 41.

In a further modification of the first or second exemplary embodiment, the longitudinal adjuster 41 which is present is not unlocked during the free-pivoting of the backrest.

LIST OF DESIGNATIONS

1 Vehicle seat
2 Backrest
3 Seat part
5 Fitting
7 Handwheel
8 Free-pivoting operating element
9 Fitting lower part, fitting part
11 Adjustment fitting
12 Free-pivoting unit
14 Free-pivoting part, fitting part
14' Stop
16 Latching element
16*a* Recess
17 Mating element
18 Catch locking element
18*a* Locking bolt
18*b* Ring
20 Cover
22 First bearing pin
32 Second bearing pin
34 Catch arrangement
34*a* Catch
34*a*' End region
34*a*" End
34*a*"' Bearing point
34*b* Pin
34*c* Lever
34*c*' First projection, projection
34*c*" Second projection
36 Spring
41 Longitudinal adjuster
43 Handle
A Axis
B Pivoting axis (lever 34*c*)
C Contact region (linear contact ring 18*b*-catch 24*a*)
H1 Offset (unloaded, freely pivoted position)
H2 Offset (loaded, freely pivoted position)

The invention claimed is:

1. A fitting for a vehicle seat, in particular for a motor vehicle seat, with an adjustment fitting for the inclination adjustment of a backrest of the vehicle seat relative to a seat part of the vehicle seat, a free-pivoting unit for the central free-pivoting of the backrest from at least one use position into a freely pivoted position about an axis (A), a fitting lower part which is a fitting part to be connected to the seat part and which bears the adjustment fitting, a free-pivoting part which is a fitting part assigned to the free-pivoting unit and which is to be connected to the backrest and which is locked in the use position, and a catch arrangement which is arranged pivotably on one of the fitting parts and fixes the free-pivoting part in the freely pivoted position of the backrest by means of interaction with a mating element formed on the other fitting part, wherein the catch arrangement has a pivot axis (B), the catch arrangement furthermore has a catch and a lever, which are pivotable relative to each other about an axis spaced apart from the pivot axis (B), the catch is of contoured design in the manner of a hook in an end region and is in engagement in a punctiform or linear contact region (C) with a catch locking element in the freely pivoted position of the backrest for locking purposes, and the catch, in particular the other end of the catch, interacts with a spring, the lever, in the region of a first end, is mounted pivotably about the pivot axis (B) and, in the region of its opposite, second end, rotatably supports the catch, wherein, in the unloaded, freely pivoted position, a perpendicular plane in the contact region (C) is located along one side of the pivot axis (B) or through the pivot axis (B), as a result of which a torque closing the catch is produced or no torque is produced and, when a pivoting-back force is applied to the backrest in the freely pivoted position, the perpendicular plane in the contact region (C) is located along the opposite side or outside the pivot axis (B), as a result of which a torque opening the catch is produced.

2. The fitting as claimed in claim 1, wherein the spring is designed as a spiral spring and is arranged about the pivot axis (B).

3. The fitting as claimed in claim 1, wherein the spring is bent outward at its free end acting upon the catch arrangement and bears against that end of the catch which is opposite the hook-like end region, and in that the lever has at least one projection which can come into contact with the end of the catch.

4. The fitting as claimed in claim 1, wherein part of the catch locking element is a locking pin which bears a ring which is mounted on a sliding bearing or rolling bearing and with which the catch interacts.

5. The fitting as claimed in claim 1, wherein the relative movement of the catch arrangement with its catch and the catch locking element in order to release the locking of the freely pivoted position is a rolling movement.

6. The fitting as claimed in claim 1, wherein, upon interaction with the catch locking element in the unloaded state, the catch arrangement bears on the latter in a self-locking manner and bears on the latter under an opening load on account of the catch arrangement moving into a non-self-locking state.

7. The fitting as claimed in claim 1, wherein, when the catch arrangement is fixed on the fitting lower part, the end region of the catch slides, during the free-pivoting of the backrest, along a component of the free-pivoting unit until it reaches the catch locking element, and, during the free-pivoting of the backrest, the end region of the catch comes into contact with the catch locking element, the catch arrangement which has come into contact with the catch locking element pivots upward with the further pivoting movement of the backrest and slides along the catch locking element until it passes the catch locking element and drops therebehind in a locking manner owing to the prestressing of the spring.

8. The fitting as claimed in claim 1, wherein, during a loading of the catch in a locked state behind the catch locking element, before the catch is released a relative movement takes place between the catch and the lever arm bearing the catch.

9. A vehicle seat with an inclination-adjustable and freely pivotable backrest, including at least one fitting as claimed in claim 1 for the inclination adjustment and for the free-pivoting of the backrest.

* * * * *